United States Patent
Kupec

(10) Patent No.: US 9,272,648 B1
(45) Date of Patent: Mar. 1, 2016

(54) REMOVABLE BACKREST FOR AN AUTOMOBILE STORAGE AREA

(71) Applicant: Edward M. Kupec, Lufkin, TX (US)

(72) Inventor: Edward M. Kupec, Lufkin, TX (US)

(*) Notice: Subject to any disclaimer, the term of this patent is extended or adjusted under 35 U.S.C. 154(b) by 0 days.

(21) Appl. No.: 14/467,888

(22) Filed: Aug. 25, 2014

(51) Int. Cl.
*B60N 2/64* (2006.01)
*B60N 2/015* (2006.01)
*B60N 2/02* (2006.01)
*B60N 2/24* (2006.01)

(52) U.S. Cl.
CPC .............. *B60N 2/64* (2013.01); *B60N 2/01508* (2013.01); *B60N 2/02* (2013.01); *B60N 2/24* (2013.01)

(58) Field of Classification Search
CPC ...... B60N 2/00; B60N 2/015; B60N 2/01508; B60N 2/02; B60N 2/3095; B60N 2/3097; B60N 2/64; B60R 13/01; B62D 33/0273
USPC ............ 296/37.6, 50, 57.1, 60, 63, 64, 65.01, 296/65.03, 182.1; 297/230.1
See application file for complete search history.

(56) References Cited

U.S. PATENT DOCUMENTS

| | | | |
|---|---|---|---|
| 5,516,179 A * | 5/1996 | Tidwell ........................... | 296/63 |
| 5,971,464 A | 10/1999 | Davis et al. | |
| 6,116,676 A | 9/2000 | Edwards | |
| 6,824,186 B2 | 11/2004 | Brown | |
| 6,932,408 B1 * | 8/2005 | Lyod et al. ...................... | 296/63 |
| 7,080,870 B1 | 7/2006 | McCann et al. | |
| 8,123,271 B1 | 2/2012 | Wimberley | |
| 2014/0125084 A1 | 5/2014 | Vertanen | |

* cited by examiner

*Primary Examiner* — Jason S Daniels
(74) *Attorney, Agent, or Firm* — Gardere Wynne Sewell LLP

(57) ABSTRACT

A backrest system for use in an automobile storage space includes a back rest member with a front surface, a back surface and a channel coupled to the back surface. The channel extends along a longitudinal axis of the backrest member and includes a first open end and a second open end opposite from the first open end. A first extension member is positionable in the channel and is movable within the channel with respect to the first open end. A second extension member is positionable in the channel and is movable with respect to the second open end. A first coupling member and a second coupling member are positionable on opposite sides of an automobile storage space so as to provide a coupling location for the first extension and the second extension to secure the backrest system in an automobile storage space.

19 Claims, 4 Drawing Sheets

REMOVABLE BACKREST FOR AN AUTOMOBILE STORAGE AREA

TECHNICAL FIELD

This disclosure relates to a backrest to allow one or more people to comfortably sit in or near an automobile storage area, and in particular, to a removable backrest that is easily installed and removed from an automobile storage area.

BACKGROUND OF THE DISCLOSURE

Pickup trucks and other types of vehicles, such as hatchback cars and station wagons, include an area toward a rear of the vehicle that provides cargo space. In the case of a pickup truck, this space is called a "truck bed," while in other types of vehicles this space is often called a "trunk." In some cases, these automobiles also include a horizontally-opening door positioned at a rear end of the vehicle to provide access to the cargo space. In some cases, the door is hingedly attached to the automobile at a lower end of the storage space so that the door opens to a horizontal, substantially flat position. In many cases, this type of door is called a "tail gate."

Because tail gates and other horizontally-opening doors are positioned in a horizontal orientation when opened, users often utilize the door as a place to sit. However, prolonged sitting on a tailgate can be very uncomfortable as the horizontal door is not designed as a seat and thus does not include a backrest. It would be beneficial to have a removable backrest for use near a horizontally-opening door of an automobile storage space to allow for more comfortable use of the door as a seat.

SUMMARY

In a first aspect, there is provided a backrest system for use in an automobile storage space. The backrest system includes a back rest member that includes a front surface and a back surface and a channel that is coupled to the back surface of the backrest member. The channel extends along a longitudinal axis of the backrest member and includes a first open end and a second open end opposite from the first open end. A first extension member is positionable in the channel and movable with respect to the first open end and a second extension member is positionable in the channel and movable with respect to the second open end. A first coupling member and a second coupling member are positionable on opposite sides of an automobile storage space so that the first coupling member is removably couleable to the first extension and the second coupling member is removably coupleable to the second extension member to hold the backrest member in the automobile storage space.

In some embodiments, the channel has a U-shaped cross section and an open side of the U-shaped cross section is coupled to the back surface of the back rest member.

In some other embodiments, the first extension member includes has U-shaped cross section and the second extension member also has a U-shaped cross section.

In another embodiment, the first and second extention members are positionable in the channel such that an open side of the U-shaped cross section of the first and second extension members faces away from the back surface of the backrest member.

In still another embodiment, the first and second extension members each include a protrusion on an exposed end of the first and second extension members and the first and second couplings include slots configured to receive the protrusions.

In yet another embodiment the slots are angled at a non-vertical angle.

In some embodiments, the first and second extension members are rigid and inextensible.

In other embodiments, the extension members are coupleable to the couplings to position the backrest member in an elevated position above a floor of a storage area of a vehicle.

In a second aspect, there is provided a backrest apparatus for use in an automobile storage space that includes a backrest member with a front surface and a back surface and a channel coupled to the back surface of the backrest member. The channel extends along a longitudinal axis of the backrest member and includes a first open end and a second open end opposite from the first open end. The apparatus includes a first extension member positionable in the channel and movable with respect to the first open end and a second extension member positionable in the channel and movable with respect to the second open end. The first extension member is securable to a first side of an automobile storage space and the second extension member is securable to a second side of the automobile storage space that is opposite from the first side of the automobile storage space.

In some embodiments, the backrest member has a planar body portion.

In other embodiments, the backrest member includes a first flange at a top edge of the planar body portion and a second flange at a bottom edge of the planar body portion.

In yet other embodiments, the first extension member and the second extension member are selectively securable in place with respect to the back rest member.

In still other embodiments, the channel couples directly to the back surface of the backrest member.

In another embodiment, the channel has a U-shaped cross sectional shape.

In still another embodiment, a length of the channel is shorter than a length of the backrest member.

In a third aspect, there is provided a backrest apparatus for use in an automobile storage space that includes a backrest member with an upper flange and a lower flange. The apparatus also includes a channel coupled to the backrest member that extends along a longitudinal axis of the backrest member and is positioned between the upper flange and the lower flange. The apparatus includes a first extension member and a second extension member positionable in the channel. The first extention member and the second extension member are movable within the channel to secure the backrest member to a first side of an automobile storage space and a second side of the automobile storage space that is opposite from the first side of the automobile storage space.

In some embodiments, the first extension member has a first protrusion that is securable to the first side of the automobile storage space and the second extension member has a second protrusion that is securable to the second side of the automobile storage space.

In other embodiments, the first protrusion is removably securable in a first slot and the second protrusion is removably securable in a second slot.

In still other embodiments, the first slot and the second slot extend at a non-vertical angle.

In yet another embodiment, a cushion is coupled to the backrest member.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1A:
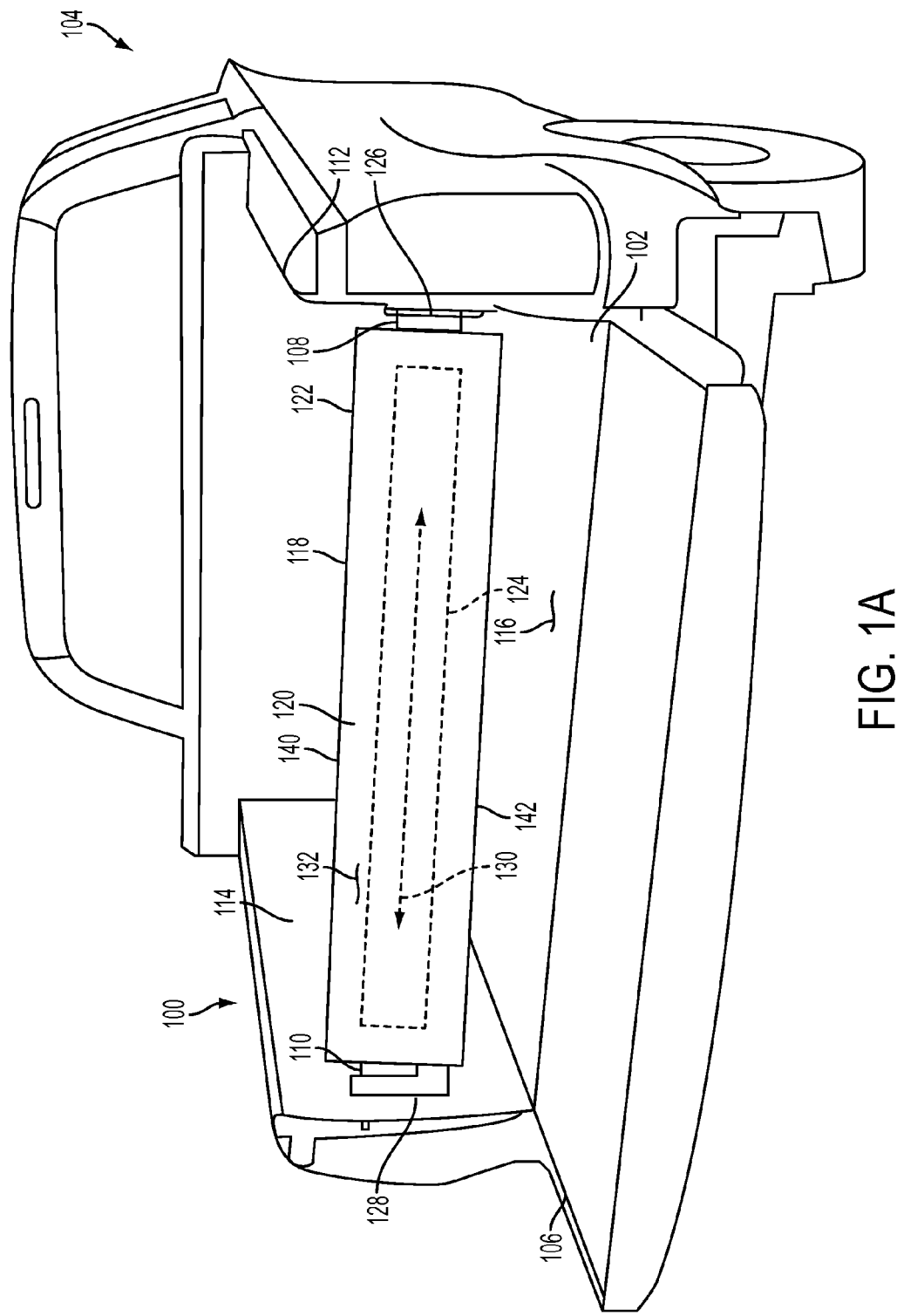
FIG. 1A is a perspective view of an embodiment of a backrest system removably coupled to a storage space of an automobile in accordance with this disclosure.

FIG. 1A illustrates an embodiment of a backrest system 100 that is removably coupled to a storage space 102 of an automobile 104 to provide a comfortable and convenient backrest for one or more users seated on a rear door 106 of the automobile 104. In some embodiments, the backrest member 118 is removably installed in or near the storage space 102 of the automobile 104 by removably coupling a first extension member 108 and a second extension member 110 to opposite sides 112 and 114 of the automobile storage space 102. As such, the backrest member 118 is suspended above a floor 116 of the automobile 104 storage space 102 adjacent to the rear door 106 to provide a back support for users who are seated on the rear door 106. In some embodiments, the width of the backrest system 100 is adjustable to account for the different widths of the storage space 102 of various automobiles 104. In some embodiments, the backrest system 100 is constructed of a material that is weather resistant and can remain coupled to an exposed storage space 102 of an automobile 104, such as a truck bed of a pickup truck, while the rear door 106 is in the open or closed position. A single user can easily install or remove the backrest system 100 and can compact the system 100 for easy storage in the automobile storage space 102 or elsewhere in the automobile 104.

Referring again to FIG. 1A, in some embodiments the backrest system 100 includes a backrest member 118 that includes a front surface 120 and a back surface 122; a channel 124 (see also FIG. 3) coupled to the back surface 122 of the backrest member 118; a first extension member 108 movably positioned in the channel 124; a second extension member 110 movably positioned in the channel 124; a first coupling member 126 positioned on a first side 112 of the automobile 104 storage space 102; and a second coupling member 128 positioned on a second side 114 of the automobile 104 storage space 102. In some embodiments, the front surface 120 of the backrest member 118 includes one or more surface features 132 to increase the durability and/or comfort of the backrest member 118. As shown in FIG. 1A, the backrest member 118 is securable in an elevated position above the floor 116 of the storage space 102 by removably coupling the first extension member 108 to the first coupling member 126 and removably coupling the second extension member 110 to the second coupling member 128. The position of the first and second extension members 108 and 110 with respect to the backrest member 118 is adjustable to adjust the total width of the backrest system 100. In some embodiments, the first and second extensions members 108 and 110 are movable along a longitudinal axis 130 of the backrest member 118 to extend (or retract) the total width of the backrest system 100. Thus, in some embodiments the backrest system 100 can be sized to fit within various storage spaces 102.

Figure 1B:
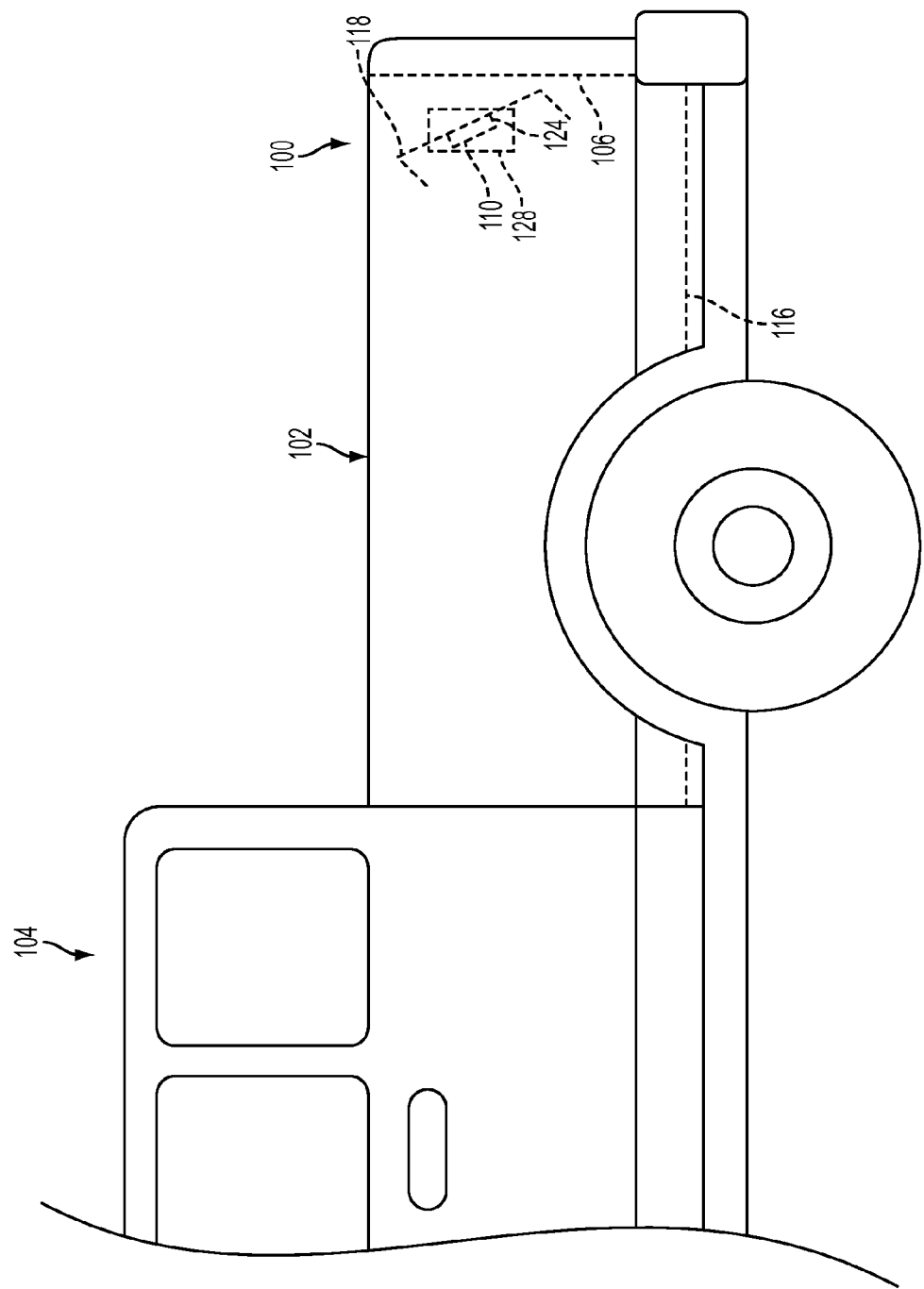
FIG. 1B is a side view of an embodiment of a backrest system removably coupled to a storage space of an automobile in accordance with this disclosure.

In some embodiments, the backrest member 118, the first extension member 108 and the second extension member 110 are made of weather resistant material, such as, for example, a metal material or a hardened plastic material. In addition, in some embodiments the coupling members 126 and 128 are also made of a weather-resistant material. In some embodiments, the backrest system 100 remains attached to an exposed storage space 102, such as a truck bed of a pickup truck, when the system 100 is not in use. In addition, as shown in FIG. 1B, in some embodiments the backrest system 100 is positionable in the automobile storage space 102 such that the rear door 106 of the automobile 104 can be positioned in the closed position while the system 100 is installed.

Referring again to FIG. 1, in some embodiments the coupling members 126 and 128 are removably coupled to the side surfaces 112 and 114 of the storage area 102 of the automobile 104 while in other embodiments the coupling members 126 and 128 are permanently coupled to the side surfaces 112 and 114 of the storage area 102. In yet other embodiments, the coupling members 126 and 128 are integrally formed with the side surfaces 112 and 114 of the storage space 102.

Figure 2:
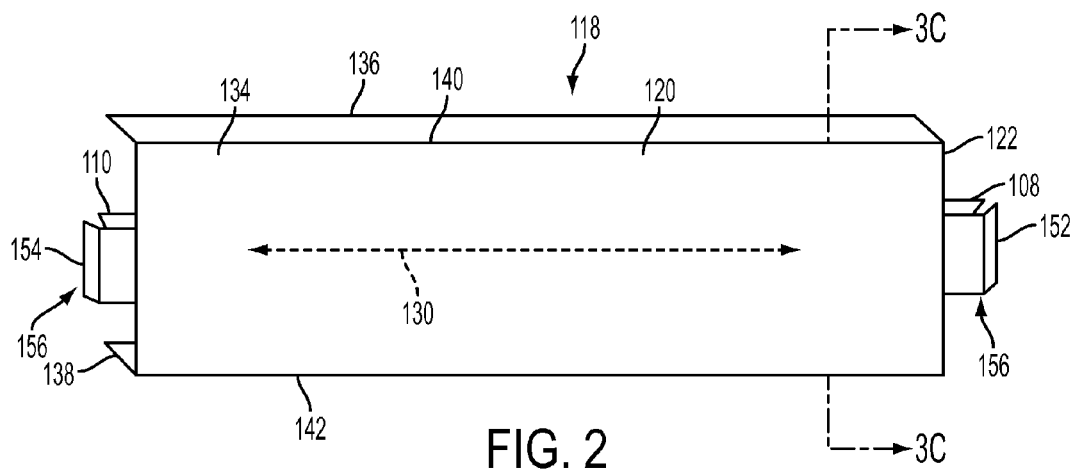
FIG. 2 is a perspective view of an embodiment of a backrest member, a first extension member and a second extension member in accordance with this disclosure.

Referring now to FIG. 2, in some embodiments the backrest member 118 includes a body section 134, a first flange 136 extending from a top end 140 of the body section 134, and a second flange 138 extending from a bottom end 142 of the body section 134. The first and second flanges 136 and 138 extend along a longitudinal axis 130 of the backrest member 118 and provide structural strength to the backrest member 118. In the embodiment of FIG. 2, the body section 134, the first flange 136 and the second flange 138 are rectangular and planar. However, in other embodiments the body section 134, the first flange 136 and the second flange 138 have other shapes and surface structures. For example, in other embodiments the body section 134 has a curved shape and the first and second flanges 138 extend along the curved edges of the body section 134. In other embodiments, the body section 134 has indentations and contours to conform to the shape of a user's back. In other embodiments, the backrest member 118 does not include flanges 136 and 138 and is made of a thick material to provide structural strength to the backrest member 118.

Figure 3A:
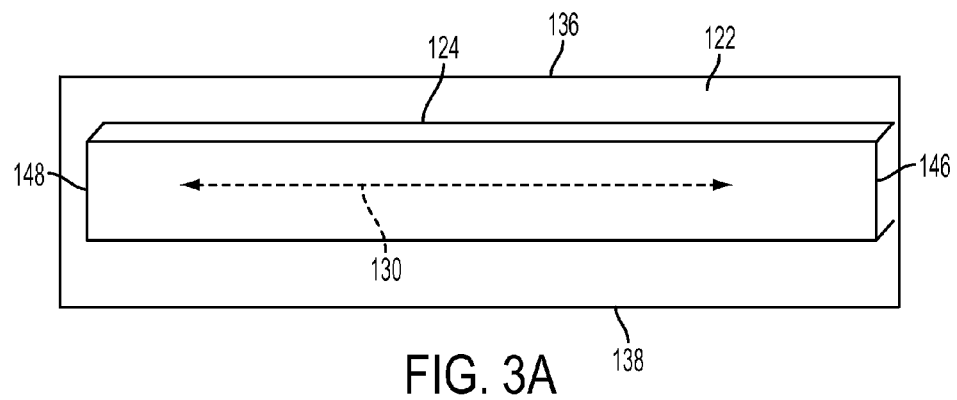
FIG. 3A is a perspective, back side view of an embodiment of a backrest member in accordance with this disclosure.
Figure 3B:
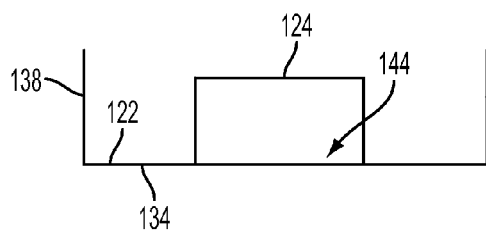
FIG. 3B is a side view of an embodiment of a backrest member in accordance with this disclosure.

Referring now to FIGS. 3A and 3B, in some embodiments the channel 124 is coupled to the back surface 122 of the body section 134 and includes a C-shaped cross section. In some embodiments, an open side 144 (see FIG. 3B) of the C-shaped channel 124 is coupled to the back surface 122 of the backrest member 118 so that the channel 124 and the back surface 122 of the backrest member 118 form a rectangular opening. In other embodiments, the channel 124 has another cross-sectional shape. In some embodiments, the channel 124 has a length that is slightly shorter than the length of the backrest member 118. As illustrated in FIG. 3A, in some embodiments the channel 124 is positioned between the first flange 136 and the second flange 138 on the backrest member 118. The channel 124 has a first open end 146 and a second open end 148 through which the first and second extension members 108 and 110, respectively, are movable. As shown in FIG. 2, the first and second extension members 108 and 110 are movable within the first and second open ends 146 and 148 to adjust the width of the backrest system 100.

Figure 3C:
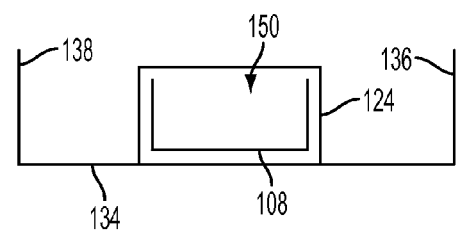
FIG. 3C is a cross-sectional side view of the backrest member of FIG. 2 taken along line 3C-3C.

Referring now to FIG. 3C, in some embodiments the extension members 108 and 110 (extension member 108 is shown in FIG. 3C) also have a C-shaped cross-sectional shape and are positioned within the channel 124 such that an open side 150 of the extension members 108 and 110 faces away from the body section 134. As shown in FIG. 3C, in some embodiments the extension members 108 and 110 are slightly smaller than the channel 124 so that the extension members 108 and 110 are movable within the channel 124.

Figure 4A:
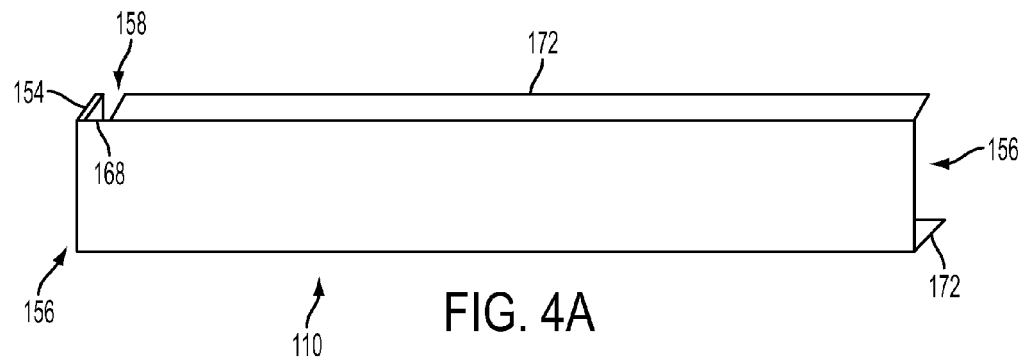
FIG. 4A is a perspective view of an embodiment of a first extension member in accordance with this disclosure.
Figure 4B:
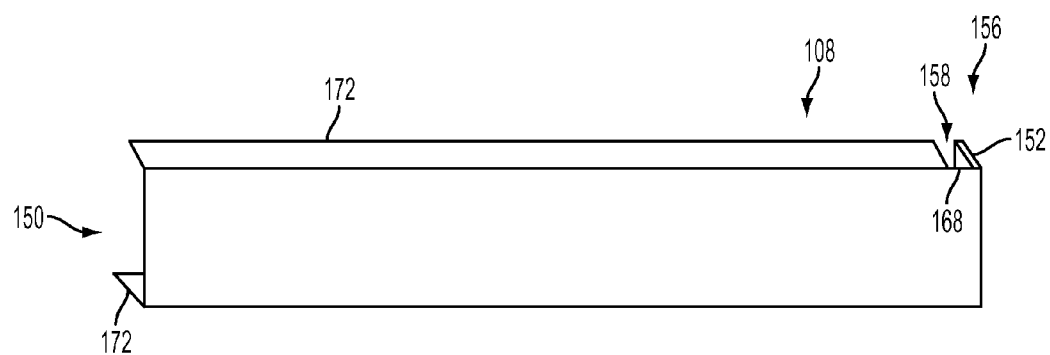
FIG. 4B is a perspective view of an embodiment of a second extension member in accordance with this disclosure.

Referring now to FIGS. 4A and 4B, in some embodiments the first and second extension members 108 and 110 are inextensible and rigid. In other embodiments, the first and second extension members 108 and 110 are extensible, for example, by way of a telescoping extension feature. In some embodiments, the first and second extension members 108 and 110 each include a protrusion 152 and 154, respectively, positioned on an exposed end 156 of the extension members 108 and 110. In some embodiments, the first and second extension members 108 and 110 also include a cutout portion 158 adjacent to the first and second protrusions 152 and 154. In some embodiments, the protrusions 152 and 154 extend in the same direction as flanges 172 of the extension members 108 and 110. The protrusions 152 and 154 are configured to removably secure the first and second extension members 108 and 110 to coupling members 126 and 128 on the sides 112 and 114 of the automobile 104 storage space 102.

Figure 5A:
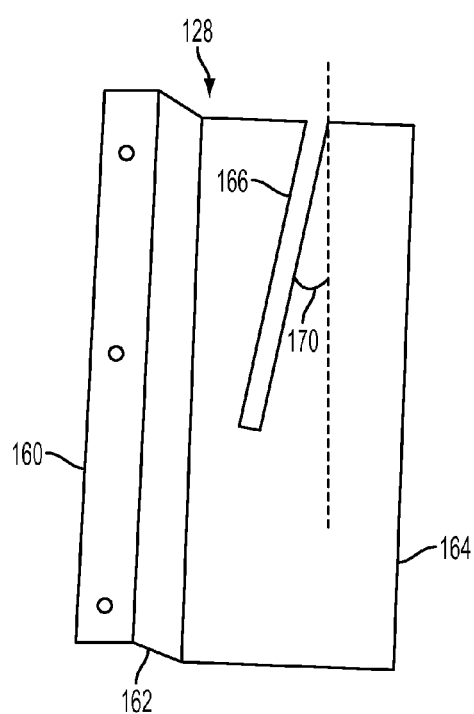
FIG. 5A is a perspective view of an embodiment of a first coupling member in accordance with this disclosure.
Figure 5B:
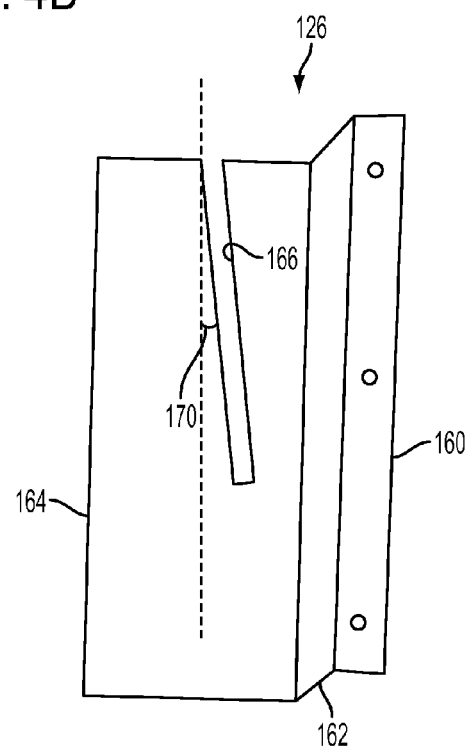
FIG. 5B is a perspective view of an embodiment of a second coupling member in accordance with this disclosure.

Referring now to FIGS. 5A and 5B, in some embodiments the first and second coupling members 126 and 128 each include a coupling portion 160, a shoulder 162, and a body section 164. In some embodiments, the coupling portion 160 is configured to be secured to a side 112 or 114 of the storage space 102 of an automobile 104, such as a side wall of the truck bed. The shoulder 162 extends between the coupling portion 160 and the body section 164, and positions the body section 164 in a spaced apart relationship to the surface of a side 112 or 114 of the automobile storage space 102 when the coupling member 126 or 128 is secured in a storage space 102. The body section 164 extends from the shoulder 162 and includes a slot 166 that is configured to receive a portion of one of the extension member 108 and 110. In some embodiments, for example, a linking portion 168 of the extension member 108 or 110 adjacent to the cutout portion 158 is positionable within the slot 166 to removably secure the extension member 108 and 110 to the coupling member 126 or 128 so that the protrusion 152 or 154 is positioned between the body section 164 of the coupling member 126 or 128 and the surface of a side 112 or 114 of the automobile storage space 102 and the linking portion 168 is located within the slot 166. In other words, a user can secure the extension members 108 and 110 to the coupling members 126 and 128 by sliding the linking portions 168 within the slots 166. In some embodiments, the slots 166 are oriented at a non-vertical angle 170 so that the backrest member 118 is also at a non-vertical angle when the first and second extensions 108 and 110 are secured to the first and second coupling members 126 and 128, respectively. To remove the backrest member 118, a user slides the first and second extension members 108 and 110 upwards until the linking portions 168 are removed from the slots 166.

Referring again to FIGS. 1A-5B, to use the system 100 a user moves the first and second extension members 108 and 110 along the horizontal axis 130 to position the first and second extension members 108 and 110 so that the overall width of the backrest system 100 matches the width of the storage space 102 and so that the exposed ends 156 of the first and second extension member 108 and 110 are aligned with the coupling members 126 and 128. The user then slides the linking portion 168 of each extension member 108 and 110 into the corresponding slot 166 of the first and second coupling member 126 and 128 to secure the backrest member 118 to the storage area 102. In order to remove the backrest member 118, the user lifts the backrest member 118 away from the coupling members 126 and 128 so that the linking portions 168 of the extension members 108 and 110 slide out of the slots 166. The user can then retract the extension members 108 and 110 toward the backrest member 118 for compact storage of the backrest system 100.

The foregoing describes only some embodiments of the invention(s), and alterations, modifications, additions and/or changes can be made thereto without departing from the scope and spirit of the disclosed embodiments, the embodiments being illustrative and not restrictive. For example, in other embodiments, other types of coupling mechanisms are used to removably couple the backrest member 118 to the automobile storage space 102. For example, in some embodiments the first and second extension members 108 and 110 are removably coupled to features that are integral with the automobile storage space 102 (e.g., slots or other feature that are built into the side walls 112 and 114 of the automobile storage space 102). In other embodiments, the first and second extension members 108 and 110 are removably coupled to the first and second coupling members 126 and 128 (which may be coupled to the automobile storage space 102 or integral with the storage space 102) by a method other than the interaction between the linking portions 168 and the slots 166. For example, in some embodiments the first and second coupling members 126 and 128 include a rectangular opening in the body section 164 and the first and second extension members 108 and 110 are extended within the openings to removably secure the first and second extension members 108 and 110 to the automobile storage space 102.

In other embodiments, a cushion (not shown) is movably coupled to the backrest member 118 to provide additional comfort to a user. For example, in some embodiments the backrest member 118 includes a plurality of openings (not shown) along the top end 140 of the body section 134 and a cushion with a corresponding number of hooks is secured to the backrest member 118 by coupling the hooks to the openings. Thus, in some embodiments a user can selectively position the cushion between the user's back and the backrest member 118, for example, by flipping the cushion from the back side of the backrest member 118 to the front side of the backrest member 118. In other embodiments, a user can secure the first and second extension members 108 and 110 to the backrest member 118 to hold the first and second extension members 108 and 110 in position with respect to the backrest member 118. For example, in some embodiments, one or more set screws (not shown) are positioned in the channel 124 such that the set screws can be tightened to secure the first and second extension members 108 and 110 in position with respect to the channel 124. Thus, in some embodiments the user can adjust the backrest system 100 to the width of the storage space 102 of the user's automobile 104 and then secure the first and second extension members 108 and 110 in place at the desired width using the set screws.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the inventions are not to be limited to the disclosed embodiments, but on the contrary, are intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A backrest system for use in an automobile storage space, comprising:
   a back rest member comprising a front surface and a back surface;
   a channel coupled to the back surface of the backrest member, wherein the channel extends along a longitudinal axis of the backrest member, wherein the channel includes a first open end and a second open end opposite from the first open end;
   a first extension member positionable in the channel and movable with respect to the first open end;
   a second extension member positionable in the channel and movable with respect to the second open end; and
   a first coupling member and a second coupling member, wherein the first and second coupling members are positionable on opposite sides of an automobile storage space, wherein the first coupling member is removably coupleable to the first extension member and the second coupling member is removably coupleable to the second extension member to hold the backrest member in the automobile storage space, wherein the first extension member comprises a U-shaped cross section and the second extension member comprises a U-shaped cross section, wherein the first and second extension members are positionable in the channel such that an open side of the U-shaped cross section of the first and second extension members faces away from the back surface of the backrest member.

2. The backrest system of claim 1, wherein the channel comprises a u-shaped cross section, wherein an open side of the u-shaped cross section is coupled to the back surface of the back rest member.

3. The backrest system of claim 1, wherein the first and second extension members each include a protrusion on an exposed end of the first and second extension members and the first and second coupling members include slots configured to receive the protrusions.

4. The backrest system of claim 3, wherein the slots are angled at a non-vertical angle.

5. The backrest system of claim 1, wherein the first and second extension members are rigid and inextensible.

6. The backrest system of claim 1, wherein the extension members are coupleable to the coupling members to position the backrest member in an elevated position above a floor of a storage area of a vehicle.

7. A backrest apparatus for use in an automobile storage space, comprising:
   a backrest member comprising a front surface, a back surface and a channel that includes a first open end and a second open end opposite from the first open end;
   a first extension member positionable in the channel and movable with respect to the first open end;
   a second extension member positionable in the channel and movable with respect to the second open end, wherein the first extension member is securable to a first side of an automobile storage space and the second extension member is securable to a second side of the automobile storage space, wherein the first extension member and the second extension member are positionable parallel to a door of the automobile storage space, wherein the backrest member, the first extension member and the second extension member are positionable in the automobile storage space so as to not obstruct free movement of the door of the automobile storage space between an open position and a closed position, wherein the backrest member is spaced from and does not contact the door of the automobile storage space when the first extension member is secured to the first side of the automobile storage space, the second extension member is secured to the second side of the automobile storage space, and the door of the automobile storage space is in the closed position.

8. The backrest apparatus of claim 7, wherein the backrest member has a planar body portion.

9. The backrest apparatus of claim 8, wherein the backrest member includes a first flange at a top edge of the planar body portion and a second flange at a bottom edge of the planar body portion.

10. The backrest apparatus of claim 7, wherein the first extension member and the second extension member are selectively securable in place with respect to the back rest member.

11. The backrest apparatus of claim 7, wherein the channel couples directly to the back surface of the backrest member.

12. The backrest apparatus of claim 7, wherein the channel has a U-shaped cross sectional shape.

13. The backrest apparatus of claim 7, wherein a length of the channel is shorter than a length of the backrest member.

14. The backrest of claim 7, wherein the backrest member, the first extension and the second extension are positionable between the door of the automobile storage space and a passenger area when the door is in the closed position.

15. A backrest apparatus for use in an automobile storage space, comprising:
   a backrest member comprising
   a channel;
   a first extension member and a second extension member positionable in the channel, wherein the first extension member and the second extension member are movable within the channel to secure the backrest member to a first side of an automobile storage space and a second side of the automobile storage space that is opposite from the first side of the automobile storage space, and wherein the first extension member comprises a first main wall and two side walls to form a first U-shaped cross section and wherein the second extension member comprises a second main wall and two side walls to form a second U-shaped cross section; and wherein the first main wall of the first extension member comprises a first linking portion that is securable to the first side of the automobile storage space by sliding the first linking portion into a first non-vertical slot, and a second main wall of the second extension member comprises a second linking portion that is securable to the second side of the automobile storage space by sliding the second linking portion into a second non-vertical slot.

16. The backrest apparatus of claim 15, further comprising cushion coupled to the backrest member.

17. The backrest apparatus of claim 15, wherein the first linking portion is spaced from a distal end of the first extension member by a first protrusion and the second linking portion is spaced from a distal end of the second extension member by a second protrusion.

18. The backrest apparatus of claim 15, wherein the first and second non-vertical slots are non-horizontal.

19. The backrest apparatus of claim 15, wherein the first linking portion is removable from the first non-vertical slot by sliding the first linking portion away from the first non-vertical slot until the first linking portion no longer contacts the first non-vertical slot, and the second linking portion is removable from the second non-vertical slot by sliding the second linking portion away from the second non-vertical slot until the second linking portion no longer contacts the second non-vertical slot.

* * * * *

UNITED STATES PATENT AND TRADEMARK OFFICE
CERTIFICATE OF CORRECTION

PATENT NO. : 9,272,648 B1
APPLICATION NO. : 14/467888
DATED : March 1, 2016
INVENTOR(S) : Edward M. Kupec Page 1 of 1

It is certified that error appears in the above-identified patent and that said Letters Patent is hereby corrected as shown below:

In the Specification:

At column 1, line number 49, delete "couleable" and replace with coupleable.

At column 1, line number 59, delete "extention" and replace with extension.

At column 2, line number 47, delete "extention" and replace with extension.

Signed and Sealed this
Third Day of May, 2016

Michelle K. Lee
*Director of the United States Patent and Trademark Office*